United States Patent
Tan et al.

(10) Patent No.: US 6,760,392 B1
(45) Date of Patent: Jul. 6, 2004

(54) METHOD AND APPARATUS TO PROVIDE FIXED LATENCY EARLY RESPONSE IN A SYSTEM WITH MULTIPLE CLOCK DOMAINS WITH FIXABLE CLOCK RATIOS

(75) Inventors: Teik-Chung Tan, Austin, TX (US); Brian D. McMinn, Buda, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/439,191

(22) Filed: Nov. 12, 1999

(51) Int. Cl.[7] .................................. H04L 7/00
(52) U.S. Cl. ........................................ 375/354
(58) Field of Search ........................ 375/219, 224, 375/225, 228, 354, 371, 342, 355, 357, 359, 369, 370, 239

(56) References Cited

U.S. PATENT DOCUMENTS

| | | | | |
|---|---|---|---|---|
| 4,764,769 A | * | 8/1988 | Hayworth et al. | 342/50 |
| 5,371,880 A | * | 12/1994 | Bhattacharya | 713/400 |
| 6,038,254 A | * | 3/2000 | Ferraiolo et al. | 375/232 |
| 6,154,487 A | * | 11/2000 | Murai et al. | 375/150 |
| 6,275,547 B1 | * | 8/2001 | Saeki | 375/354 |
| 6,370,212 B1 | * | 4/2002 | Nakai | 375/359 |
| 6,400,754 B2 | * | 6/2002 | Fleming et al. | 375/140 |
| 6,424,688 B1 | * | 7/2002 | Tan et al. | 375/354 |
| 6,463,092 B1 | * | 10/2002 | Kim et al. | 375/219 |
| 6,466,589 B1 | * | 10/2002 | Chou | 370/518 |
| 6,510,013 B1 | * | 1/2003 | Oshio | 360/32 |

* cited by examiner

Primary Examiner—Mohammad H. Ghayour
Assistant Examiner—Pankaj Kumar
(74) Attorney, Agent, or Firm—Meyertons Hood Kivlin Kowert & Goetzel, P.C.; B. Noël Kivlin (57) ABSTRACT

A system and method for transferring data using an early response signal to indicate subsequent transmission of data after a fixed latency, wherein the signal and data are transferred from a first clock domain to a second clock domain using a clock skipping technique. In one embodiment, an early response signal is transmitted by a first device k clock pulses prior to transmission of the data. The receiving device, which is operating at a higher clock rate, receives the early response signal and delays the signal by the number of skipped pulses which will occur in the second clock domain before the occurrence of the $k^{th}$ valid pulse. The second device employs a skip pattern generator to generate a signal indicative of this number of skipped pulses and provides the number to a delay circuit which delays the early response signal for an this number of clock pulses. The delayed early response signal is then output to the appropriate logic to indicate the latency of the subsequent data transfer.

12 Claims, 4 Drawing Sheets

METHOD AND APPARATUS TO PROVIDE FIXED LATENCY EARLY RESPONSE IN A SYSTEM WITH MULTIPLE CLOCK DOMAINS WITH FIXABLE CLOCK RATIOS

BACKGROUND OF THE INVENTION

1. Field of the Invention

This invention is related generally to the field of microprocessor design and more particularly to transferring an early response signal and corresponding data between clock domains in a microprocessor where the clock domains have fixable clock ratios.

2. Description of the Related Art

Figure 1:
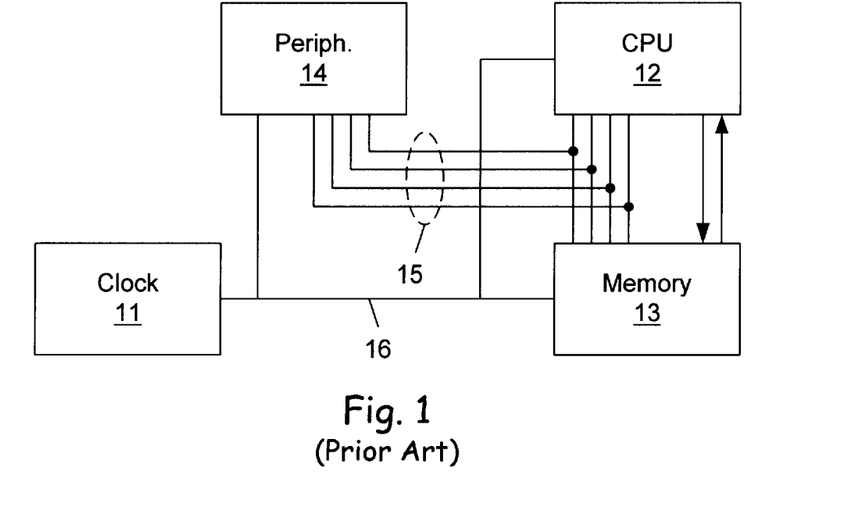
FIG. 1 is an example of a prior art computer system having a single clock domain.

In simple computer systems, a single clock signal may be used to run all of the devices which are integrated into the chip. As shown in FIG. 1, a system PLL (phase locked loop) 11 may provide a clock signal to a microprocessor 12, a memory 13 and a peripheral device 14 via clock line 16. The signal is used to clock data transfers between the devices on bus 15.

While implementation of the system illustrated in FIG. 1 is simple and relatively straightforward, its simplicity results in some performance limitations. One of these limitations relates to the variations in the clock signals which are seen by the various devices on the chip. The use of a network of conductive traces to deliver the clock signal to each of the devices causes reflections, noise and other variations in the signals. These factors cause differences in the signals arriving at the different devices, which may in turn limit the devices' ability to communicate data. For example, if there is a skew between the clock signals arriving at two devices, a value being communicated between the devices may have to be asserted by the transmitting device for a longer time than would otherwise be necessary in order to ensure that the value can be sampled by the receiving device.

In the simple system illustrated in FIG. 1, a data transfer involves two devices in the same clock domain. ("Clock domain" refers to a portion of a system in which the operation of the devices is based on a particular clock signal.) Therefore, the operation of each of the devices is based upon the same clock signal. In the absence of any clock skew, data being transferred from one of these devices to the other must be asserted for a particular amount of time before the data is sampled (the setup time) and a particular amount time after the data is sampled (the hold time.) If there is any skew between the clock signals at each of the devices, the data must be asserted long enough to account for this difference. While this additional time may not be significant in relation to slower clock speeds, high-performance, high-speed microprocessors have shorter clock periods, and data transfers may not be able to keep up with the speed of the processor.

Figure 2:
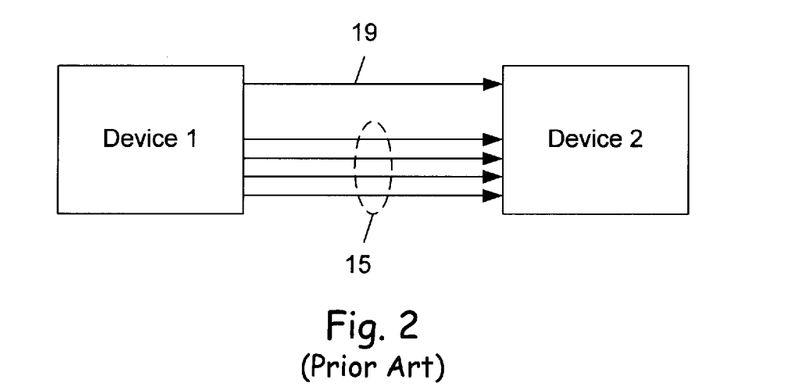
FIG. 2 is an illustration of two devices configured to transfer data using clock forwarding.

Clock forwarding is one technique which can be used to minimize the impact of clock skew and allow improved performance in data transfers. In a clock forwarding scheme, the data bus and system clock described above are replaced by point-to-point data and clock signals. When data is to be transferred from one device to another, the data is transferred along with a corresponding clock signal. This is illustrated in FIG. 2. The data is typically clocked into a series of storage locations (e.g., flip-flops) by the transmitting device according to the forwarded clock signal. The data is then clocked out of the storage locations by the receiving device according to a local clock signal. Both of the clock signals must have the same rate, but a substantial skew in the signals will not prevent reliable transfer of the data.

While clock forwarding provides a means to transfer data between devices operating at the same clock rate, it is often desirable in modern computer systems to use different clock frequencies for different devices. For example, it may be useful to operate the core logic (i.e., the microprocessor logic) and the system logic at different frequencies. The difference in frequencies allows for advances in the performance of one type of logic without requiring equal advances in the other type of logic. Thus, for example, the processor speed can be increased without having to also speed up the system logic.

In these systems, system logic is closely tied to the system bus. As a result, the system logic usually operates at a frequency which is an integer (or half-integer) multiple of the system bus frequency. Because the system logic operates at a frequency which is a multiple of the system bus frequency, clock signals for the system logic and clock signals for the system bus can both be generated from the same reference clock. If the core logic also runs at a frequency which is an integer or half-integer multiple of the system bus frequency, it can also be easily generated. For example, if the system bus is running at 66 MHz, the system logic and core logic can be operated at 200 MHz (three times the system bus frequency). Then, if desired, the frequency of the core logic can be scaled up to 266 MHz (four times the system bus frequency), while the system logic remains at 200 MHz.

As the operating frequency of the system bus increases, however, it becomes more and more difficult to scale up the speed of the core logic because this would require a larger increase in the frequency. For example, if the system bus is running at 400 MHz and both the core logic and the system logic are running at 800 MHz, the core logic cannot be easily scaled up to 900 MHz. That is, 900 MHz is not an integer or half-integer multiple of the system bus frequency. It may therefore be useful to have multiple clocks instead of a single one.

The use of multiple clock domains in a computer system may create a number of problems which must be addressed in the system. One problem is that it is difficult to communicate between two clock domains in which the clocks are not integer or half-integer multiples of each other. Another problem is that it is sometimes desirable to transmit a warning signal (or early response signal) to allow a receiving device to quickly respond to data from a transmitting device. When these devices are in different clock domains having different clock rates, it is difficult to accurately anticipate the transmission of the data based on the early response signal.

SUMMARY OF THE INVENTION

One or more of the problems described above may be solved by the various embodiments of the invention. Broadly speaking, the invention comprises a system and method for using an early response signal to transmit data with a fixed latency where the data is being transferred from a device in a first clock domain having a first clock rate to a device in a second clock domain having a second clock rate.

In one embodiment, clock-skipping techniques are used to enable communication between devices in two different clock domains having different clock rates. If the clock rates of the two clock domains were equal, one bit of data could be transferred on each clock pulse. Since, however, the clock rates of the two clock domains are not equal, transmitting and receiving one bit of data on each clock pulse would cause the number of bits transmitted to be different than the number of bits received. In other words, either the transmitted data would overrun the received data, or the received data would overrun the transmitted data. Clock pulses are therefore periodically skipped in the faster clock domain so that the number of bits transmitted is equal to the number of bits received.

In one embodiment, a first device transmits an early response signal prior to transmitting data. The early response signal is intended to provide a warning to the receiving device that data will be transmitted after a certain number of cycles. In other words, the data is transmitted with a fixed latency after transmission of the early response signal. While this latency is a fixed number of clock cycles in the transmitting device, the latency (in clock cycles) may not be the same in the receiving device (which may include both valid clock pulses and skipped pulses.) In order to provide a fixed-latency early response signal from one clock domain to the other, it is necessary to account for the skipped pulses.

One embodiment of the present system comprises a first device and a second device between which data is transferred using clock skipping techniques. The first device operates at a slower clock rate than the second device. The first device transfers an early response signal to the second device and, after a fixed number (k) of pulses, transfers data to the second device. The second device comprises a component that generates a skip pattern which defines each clock pulse as either a valid pulse or a skipped pulse. This component also generates a value (n) indicating the number of skipped pulses that will occur between receipt of the early response signal and the occurrence of the $k^{th}$ valid pulse. Upon receiving an early response signal, the second device delays for a time equivalent to the n skipped pulses before counting the k-pulse latency and then receiving the transmitted data.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

One embodiment of the invention is described below. It should be noted that this embodiment is presented as an example to illustrate the features and operation of the invention and that many other embodiments of the invention are possible.

Broadly speaking, a system and method for providing an early response signal from a device in a first clock domain to a device in a second clock domain are disclosed. The clock rates of the domains are different and are not constrained to be integer or half-integer multiples of each other. A clock skipping technique is used to enable data transfers between the devices. An early response signal is transmitted from the first device to the second device to indicate that data will be transferred a certain number of cycles after the signal. Because the devices operate at different clock rates (and one of the devices periodically skips clock pulses,) the device operating at the higher clock rate must take some action to account for the different clock rates (and skipped pulses) in order to maintain a fixed latency for the early response signal. For example, if the receiving device operates at the higher clock rate, it must delay for a period equivalent to the skipped clock pulses before counting the pulses of the early response latency so that it can accurately anticipate transmission of the subsequent data.

In one embodiment, a first device transmits data to a second device. The second device is in a clock domain which has a higher clock rate than the clock domain of the first device. The second device includes a skip pattern generator which defines a pattern of valid and skipped pulses. While the first device can transmit data on every pulse of its associated clock signal, the second device receives data only on the valid pulses of its clock signal. (For the purposes of this disclosure, "pulse" refers to an edge of a clock signal. The pulses may comprise the rising edges, falling edges, or both, depending upon the implementation of a particular embodiment.)

The first device is configured to transmit an early response signal a fixed number (k) of clock pulses before transmitting data so that the second device can be prepared to receive the data and to respond as quickly as possible to the data. (As used herein, "fixed" refers to the latency of the early response signal comprising the same number of cycles in each clock domain—k may vary from one transfer to another.) If the first device transmits an early response signal k clock pulses before transmitting corresponding data, the second device will receive the early response signal k+n clock pulses before the data, where n is the number of skipped pulses which will occur at the second device before the $k^{th}$ valid pulse occurs. The system must therefore translate the early response signal of the first clock domain to an early response signal in the second clock domain. The second device includes a mechanism which determines the value of n. The second device is configured to delay for n pulses before counting the k valid pulses of the early response latency, thereby translating the early response signal. The second device can then accurately anticipate the transmission of the data using the translated early response signal.

As an example, if a first clock domain has a clock rate which is 66% of the clock rate in a second clock domain, every third pulse in the second clock domain will be skipped during a data transfer. If a device in the first clock domain provides a two-pulse early response signal (k=2) to a device in the second clock domain, the two pulse latency may span two consecutive valid pulses, or it may span two valid pulses separated by a skipped pulse. The receiving device must therefore identify which of these two cases applies and, if necessary, delay for an additional clock pulse (corresponding to the skipped pulse.)

In one embodiment, the invention is implemented in a high-performance computing system. The computing system utilizes a microprocessor chip which includes on-chip peripheral logic. Because it is desired in this embodiment to allow the peripheral logic to operate while the CPU core is "asleep" (i.e., in a power saving mode,) it is necessary to implement separate networks to distribute clock signals to the core logic and to the peripheral logic. Each of these networks defines a separate clock domain which can have a different clock rate.

Figure 3:
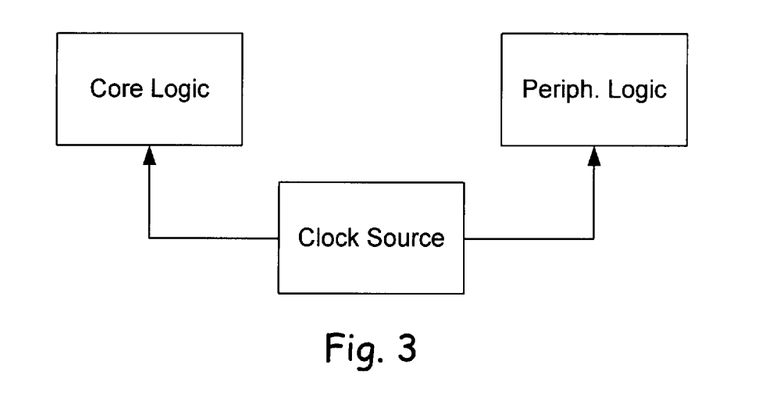
FIG. 3 is a block diagram illustrating the generation of clock signals for two distinct clock domains.

Referring to FIG. 3, the separation of the two clock domains on the microprocessor chip is illustrated. Clock source 21 provides a processor clock signal to core logic 22, thereby establishing a first clock domain. Clock source 21 provides a separate peripheral clock signal to peripheral logic 23, establishing a second clock domain. In this embodiment, the processor clock signal and peripheral clock signal have different clock rates.

Figure 4:
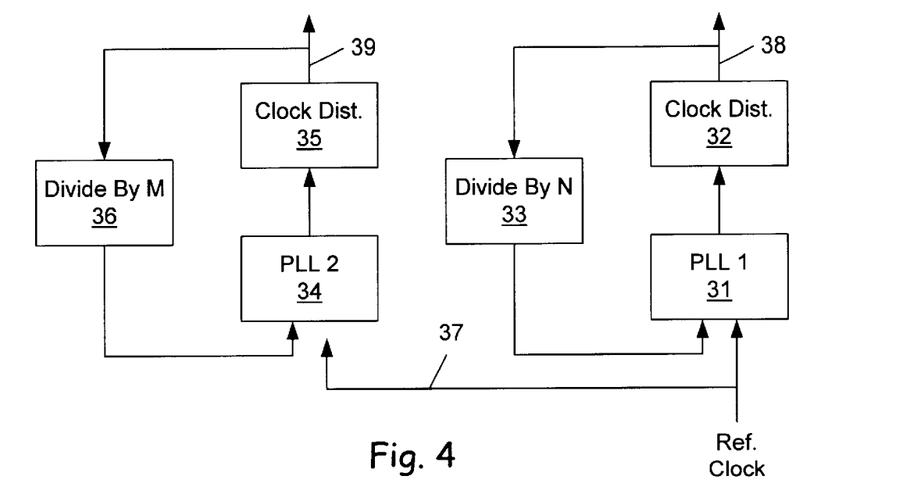
FIG. 4 is a block diagram of a dual-PLL circuit in one embodiment for generating a pair of clock signals for two clock domains.

Referring to FIG. 4, the signals to the two clock domains are provided by a dual-PLL system 30. The system includes two PLLs 31, 34 which are coupled by line 37 to a reference clock (not shown.) Each PLL generates its own clock signal based on the reference clock signal. This generated clock signal is input to distribution circuitry 32, 35. Each of the distribution circuits 32, 35 provides the resulting clock signal to its respective clock domain and to its respective divider circuit 33, 36. Divider circuits 33, 36 provide a clock signal at the original reference clock rate as an input to the respective PLL 31, 34. These inputs to the PLLs enable the PLLs to adjust the phase of their respective signals to minimize their skew from the reference signal. As a result, the skew between the clock signal of the first clock domain and the clock signal of the second clock domain is also minimized.

It is important to minimize the skews between the clock signals for several reasons. As will be explained in detail below, the clock skipping mechanism uses buffers to absorb the skew between the first clock domain and the second clock domain. If there is more skew, more buffers may be required to implement the mechanism. It should also be noted that reducing the skew between the clock signals of the two domains reduces the window of error with which the mechanism has to cope. Because reducing the skew between the clock signals reduces the number of buffers necessary in the mechanism, it has the effect of reducing the latency of data transfers that employ the mechanism and consequently improves performance.

In the dual-PLL system of FIG. 4, divider circuits 33 and 36 define the clock rates of their respective clock domains. Divider circuit 33 provides a signal at 1/N of the clock rate on line 38 and allows PLL 31 to maintain the clock rate on line 38 at N times the reference clock rate. Similarly, divider circuit 36 provides a signal at 1/M of the clock rate on line 39 and allows PLL 34 to maintain the clock rate on line 39 at M times the reference clock rate. Divider circuits 33 and 36 are programmable so that M and N can be set to appropriate values.

Dual-PLL system 30 is implemented in a manner which minimizes differences between the operation of PLLs 31 and 34. The PLLs are set up identically (except for the inputs provided by divider circuits 33 and 36) and share both a power supply and a decoupling network. The PLLs are also intended to share most of the associated test/debug logic. Dual-PLL system 30 is set up this way because it is desirable for the two PLLs to behave as identically as possible in response to dynamic changes in the power supply, temperature and other factors which may affect the clock signals generated by the PLLs. If the PLLs behave identically, errors in the clock signals should be correlated and the effective error should be less than the sum of the respective phase errors. If, on the other hand, the phase errors of the two PLLs are not correlated, effective errors in the dual-PLL system can be minimized by using the output of divider circuit 33 as an input to PLL 34 in place of the reference clock signal. In this configuration, the skew between the clock signals in the two clock domains would be limited to ±1 phase error, instead of ±2.

Data is transferred between the two clock domains using a clock-skipping technique. In other words, a first clock signal from a first clock domain is forwarded along with the data that is being transferred from the first clock domain to a second clock domain. The data is temporarily stored in a series of storage locations. The data are delivered to the storage locations serially, and each datum is stored in one of the storage locations when a corresponding clock pulse of the first clock signal is received. The data are retrieved from the storage locations in the order they were stored. Each datum is retrieved from one of the storage locations when a corresponding clock pulse of a second clock signal from the second clock domain is received. Because the first and second clock signals in this embodiment have different clock rates, one or more clock pulses of the faster of the signals must be skipped in order to prevent the associated process (either loading the storage locations or unloading them) from overrunning the other process.

Although any suitable type of storage device may be employed to store the data, the particular embodiments described below utilize flip-flops. For the purpose of this disclosure, references to flip-flops are intended to be construed to include any device that may be used to provide storage locations for the data.

Figure 5:
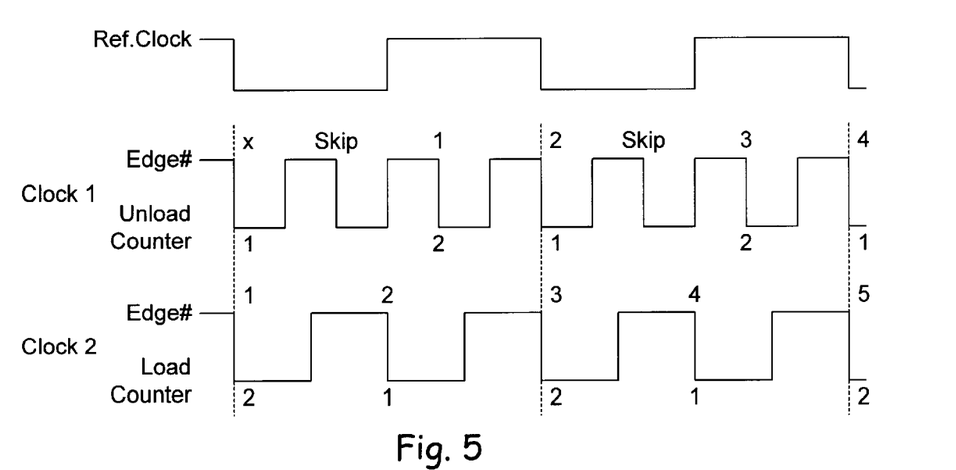
FIG. 5 is an illustration of a pattern of valid and skipped pulses in one embodiment.

FIG. 5 illustrates valid and skipped pulses in a clock skipping scheme. In this embodiment, the falling edges of the respective clock signals are regarded as the pulses. On pulses which are skipped, no storing (or retrieving) is performed in the corresponding clock domain. On pulses which are not skipped (also referred to herein as "valid" pulses,) a data value is stored (or retrieved) from the storage location. By periodically skipping pulses (i.e., not storing/retrieving data on the skipped pulses) as illustrated in FIG. 5, the system ensures that, in each period of the reference clock, the number of pulses on which data are loaded into the storage locations is equal to the number of pulses on which data are retrieved from the storage locations. This prevents the faster clock domain from overrunning data in the storage locations or reading storage locations in which there is no stable data.

FIG. 5 illustrates that, for the first clock domain (CLOCK 1), the second pulse of every reference clock period is skipped. If the first falling edge of each clock signal is synchronized with the falling edge of the reference clock signal, skipping the second pulses in each reference clock period ensures that the pulses of the first clock signal will always be in synchronization with, or shifted to the right of (i.e., lagging behind) the corresponding pulses of the second clock signal. Although the first clock signal may be shifted to the left or to both sides of the second signal, it is important to note that constraining the shift to always fall on one side of the second signal allows a single buffer to be used to absorb the shift. If the shift is allowed to periodically fall on either side, two buffers will be needed to absorb the shift.

Figure 6:
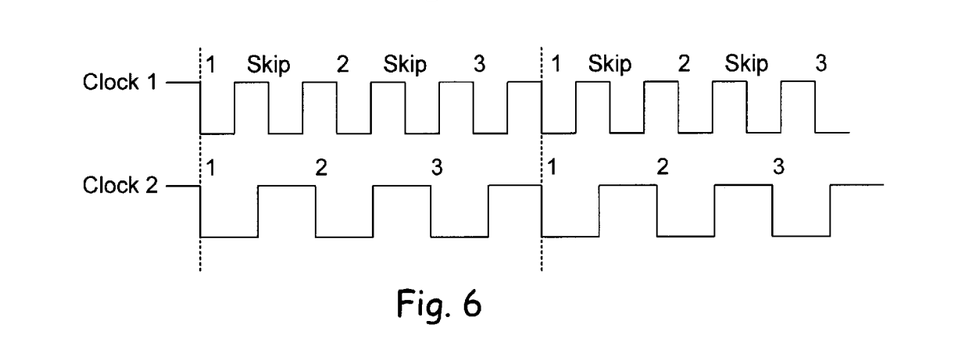
FIG. 6 is an illustration of a pattern of valid and skipped pulses in an alternate embodiment.

In the example above, the skip pattern includes one skipped pulse for every two valid pulses. In other embodiments, the skip pattern may be more complex. For example, FIG. 6 shows that, for clock domains having frequencies of five and three times the reference frequency, the skip pattern may have one valid pulse, one skipped pulse, one valid pulse, one skipped pulse, one valid pulse, and then repeat. This pattern sometimes has one valid pulse between skipped pulses, and sometimes has two. Because each of the clock signals is generated from the same reference clock, however, the pattern will repeat every reference clock period.

Figure 7:
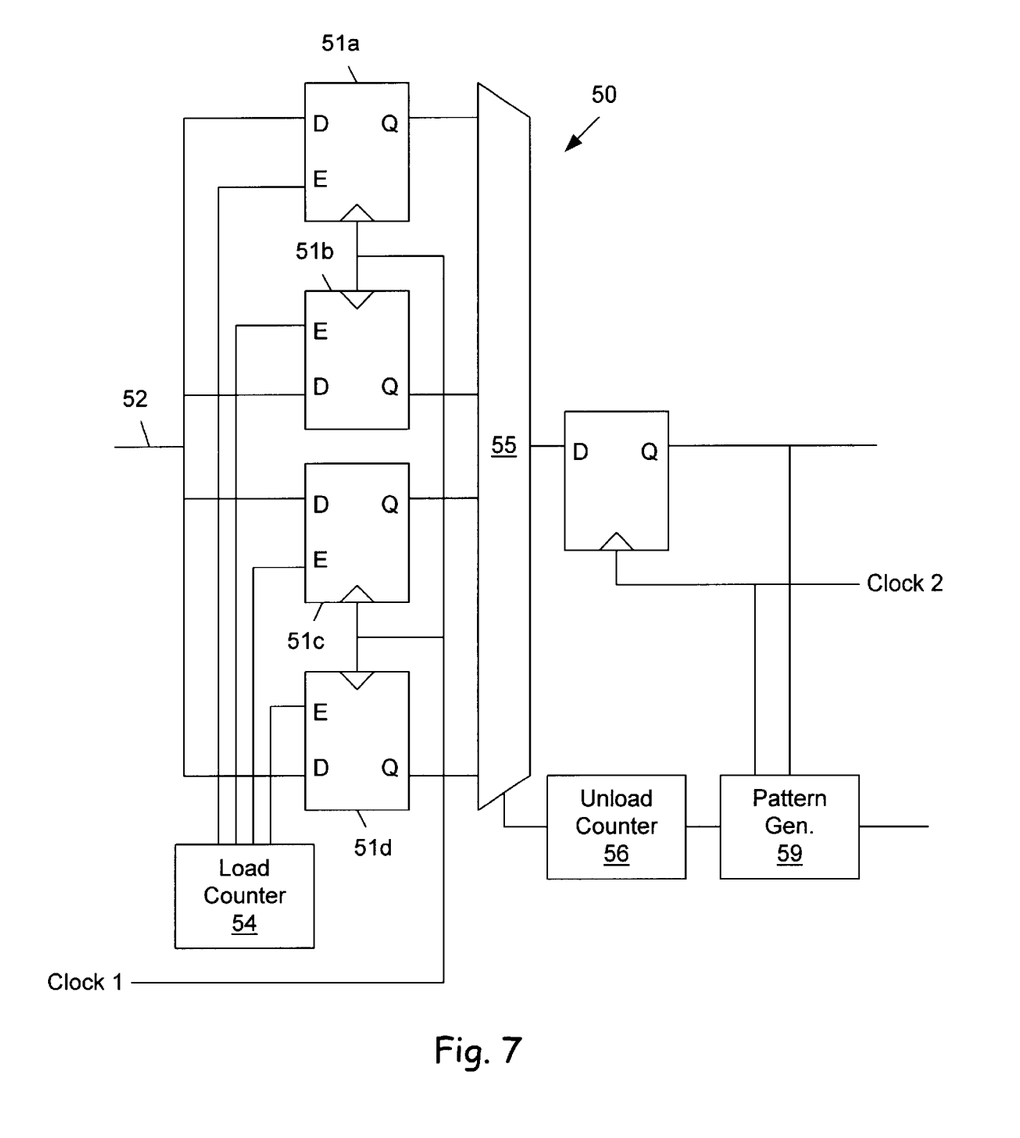
FIG. 7 is a block diagram of a clock skipping circuit in one embodiment.

One embodiment is implemented as shown in FIG. 7. The circuit shown in this figure uses a set of storage locations (flip-flops) to buffer the data and absorb the clock shift which is illustrated in FIGS., 5 and 6. A series of data values are transmitted to system 50 on data input line 52. Data input line 52 is coupled to the data (D) inputs of each of D-type flip-flops 51a–51d. (For purposes of convenience, flip-flops 51a–51d are individually and collectively referred to herein using the single reference number 51.) The clock input of each flip-flop 51 is coupled to clock line 53. The enable (E) input of each flip-flop 51 is coupled to one of the outputs of a load counter 54. Load counter 54 is also clocked by the signal on line 53. The output (Q) of each flip-flop 51 is coupled to multiplexer 55. The select input of multiplexer 55 is coupled to an unload counter 56 that controls which of the multiplexer inputs (hence which of the flip-flop outputs) is selected to be output by multiplexer 55. Unload counter 56 is clocked by the signal of skip pattern generator 59. The output of multiplexer 55 is coupled to the data input of flip-flop 57, which is clocked by the clock signal of the receiving clock domain. (Load counter 54 and unload counter 56 also have several control inputs which are used to reset the counters and which will be described in more detail below.)

Data is delivered serially to system 50 via line 52. Because the data input to each flip-flop 51 is tied to line 52, each data value is simultaneously applied to each of the flip-flops. The data value which is applied to the inputs of flip-flops 51 is only stored in the one of the flip-flops which is selected by load counter 54. Load counter 54 asserts an enable signal on one of its outputs and deasserts the enable signal on each of its remaining outputs. Each of the counter outputs is coupled to the enable input of a corresponding flip-flop so that only one of the flip-flops is enabled at one time. Consequently, the enabled flip-flop stores the currently applied data value while the other flip-flops (which are disabled) retain the values previously stored in them.

Each time a clock pulse is received by load counter 54, the counter is incremented. Each time load counter 54 is incremented, it asserts an enable signal on a successive one of the outputs coupled to flip-flops 51 (and deasserts the signal on the others.) Thus, each successive data value is stored into a successive one of flip-flops 51. After a data value is stored in the last one of flip-flops 51 (e.g. 51d,) the system cycles back to the first flip-flop (51a) and stores the next data value in it. This cycle is repeated until all of the data is transferred. Although the data value stored in each of the flip-flops will eventually be overwritten, each data value will be retrieved before it is overwritten, as will be explained in more detail below.

Each of the flip-flops 51 asserts at its output the last data value stored in the flip-flop (if any value has yet been stored therein.) These values are provided as inputs to multiplexer 55, which selects one of the inputs to be passed through to flip-flop 57. Multiplexer 55 is controlled by unload counter 56. Unload counter 56 provides a select signal to multiplexer 55 so that each of flip-flops 51 is sequentially selected in the order in which the data values were stored into them. Unload counter 56 is clocked by the signal from skip pattern generator 59 and is incremented each time a valid pulse is received. Skip pattern generator 59 produces a pattern of clock pulses which consists of one or more valid pulses, and one or more skipped pulses. The datum output by the selected flip-flop 51 is forwarded to flip-flop 57. Flip-flop 57 is clocked by the signal from the second clock domain and retains the data for one clock period. It then receives the output of a newly selected flip-flop 51 and retains that value for one clock period.

The output of flip-flop 57 is coupled to skip pattern generator 59. When an early response signal is transmitted to the second device, skip pattern generator 59 receives this signal and translates it. In this embodiment, the translation comprises delaying the signal to produce a time-adjusted early response signal. The time-adjusted early response signal is the same as the early response signal input on line 52, except that it is delayed by the number of skipped clock pulses which will occur before the $k^{th}$ valid clock pulse in the second clock domain (where k is the fixed latency of the early response signal.) The time-adjusted early response signal is then passed on to early response signal-receiving logic in the second device which is configured to prepare for a quick response to the corresponding data.

Figure 8:
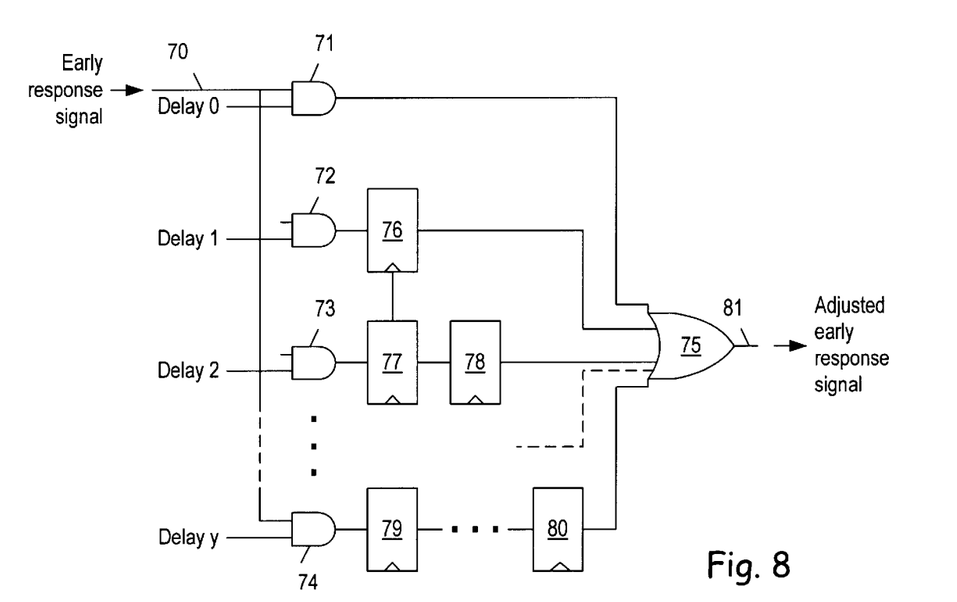
FIG. 8 is a block diagram of a delay circuit in one embodiment.

In one embodiment, skip pattern generator 59 forwards the early response signal and one or more signals indicative of the number of skipped pulses within the early response signal latency to the circuit shown in FIG. 8. This circuit may form part of pattern generator 59, or it may be a separate component. The delay circuit is configured to delay the early response signal by an amount equivalent to the number of skipped pulses. The early response signal received from the transmitting device is input to the circuit on line 70 and transmitted to each of AND gates 71–74. Signals Delay 0, Delay 1, Delay 2 and Delay y are generated by the skip pattern generator. At any one time, only one of these signals is asserted, and the remainder are deasserted. Thus, when the early response signal is received, only one of AND gates 71–74 asserts an output signal.

Signals Delay 0–Delay y are asserted or deasserted based upon the number of skipped clock pulses which will occur before the $k^{th}$ valid clock pulse. This number is generated by a skip number circuit in the skip pattern generator. If no skipped pulses will occur, Delay 0 is asserted and Delay 1–Delay y are deasserted. If one skipped pulse will occur, Delay 1 is asserted and the remainder of the Delay signals are deasserted. In other words, if there will be i skipped pulses, the signal Delay i is asserted. The maximum number of skipped clock pulses which can occur before the $k^{th}$ valid pulse is y, so the skip pattern generator is configured to assert one of y+1 potential signals. As indicated by the figure, there may be additional AND gates (and associated logic, which is described below) between gate 73 and gate 74. The output of the logic subsequent to each of the AND gates is input to OR gate 75.

The output of each AND gate (with the exception of gate 71) is conveyed to a series of one or more flip-flops 76–80. The flip-flops serve to delay the early response signal before it is output on line 81. Although not explicitly shown in FIG. 8, each of the flip-flops is clocked by the clock signal of the second clock domain (i.e., the clock domain of the receiving device.) The number of flip-flops following an AND gate is the number i of the signal Delay i. Because the signal Delay i is asserted when i pulses will be skipped, the early response signal will be forwarded to OR gate 75 through i flip-flops, thereby delaying the early response signal by i clock cycles. This adjusted early response signal is forwarded to the appropriate logic of the receiving device so that it can prepare to respond to the data which will follow after a k-pulse latency.

As indicated above, there may be more delay stages than are shown in FIG. 8. (A "delay stage" comprises one of the AND gates and any flip-flops between the AND gate and the OR gate.) There may also be fewer delay stages. The number of stages needed in this circuit is y+1, where y is the maximum number of skipped pulses before the $k^{th}$ valid pulse. y can be defined as $$y=(k/N) \times (M-N)$$

where k is a fixed number of pulses defining the latency of the early response signal, M is the clock rate of the receiving clock domain and N is the clock rate of the transmitting clock domain.

It should be noted that the number of stages required in the delay circuit is not always the same as the maximum number of skipped pulses, plus one (y+1.) If the latency of the early response signal may be any number of pulses up to k, then there must be y+1 stages. If the latency is always k (no more, no less) then less stages may be necessary. For example, considering the 3:2 ratio of the clock domains shown in FIG. 5, and using a k of 3, there will either be one or two skipped pulses between receipt of the early response signal and receipt of the corresponding data. Therefore, only two stages will be necessary—a stage having a one-pulse delay and a stage having a two-pulse delay.

As indicated above, the data value stored in each flip-flop 51 is retrieved by multiplexer 55 before it is overwritten with a new value. This is accomplished by initializing load counter 54 and unload counter 56 to appropriate values at the beginning of the data transfer. The counter values are chosen to allow the data values to become stable in the flip-flops before they are retrieved. For example, in the system illustrated in FIG. 7, load counter 54 may be initialized to 0 (selecting flip-flop 51a) while unload counter 56 may be initialized to 2 (selecting flip-flop 51c.) When the data transfer begins, the first data value will be stored into flip-flop 51a. The first flip-flop which will be read is 51c, which does not yet have a data value stored therein. Upon the subsequent valid pulse in each of the clock domains, the respective counters will increment so that the second data value will be stored into flip-flop 51b, while the second flip-flop to be read will be 51d. Upon the next valid pulse, the third data value will be stored into flip-flop 51c and multiplexer 55 will retrieve the first data value from flip-flop 51a. Thus, the data value stored in flip-flop 51a is read two clock periods after it is stored. If this were insufficient, the unload counter could be initialized to 1 to allow the data to stabilize for three clock periods. If only one clock period were necessary to allow the data to stabilize, the unload counter could be set to 3.

It is clear from the example above that a certain minimum number of flip-flops is necessary in order to allow each data value to be written into a flip-flop and allowed to stabilize before being retrieved. The number of required flip-flops can be calculated according to the following equation:

$$\frac{\text{period}_{target\ clock} + \text{delay}_{max} - \text{delay}_{min} + T_{skew} + T_{setup} + T_{hold}}{T_{bit}} + N_{shift}$$

Where:
- $\text{period}_{target\ clock}$ is the clock period of the receiving clock domain (since each data value, or bit, is transferred on a falling clock edge in the example above, the clock period would be equal to the bit time;)
- $\text{delay}_{max}$ is the maximum signal delay between the clock domains (if the transmitter and receiver logic are placed next to each other on the clock domain boundary, the delay should be essentially 0;)
- $\text{delay}_{min}$ is the minimum signal delay between the clock domains;
- $T_{skew}$ is the skew between the clock signals of the transmitting and receiving clock domains;
- $T_{setup}$ is the setup time for the flip-flops;
- $T_{hold}$ is the hold time for the flip-flops; and
- $N_{Shift}$ is the number of flip-flops required to account for the shift between the clock signals (as shown in FIGS. 6 and 7.)

In a particular embodiment, fewer flip-flops or more flip-flops than the four illustrated in FIG. 7 may be necessary. For example, if the skew between the clock signals of the two clock domains increases, the required number of flip-flops may increase to five or more. Conversely, if there is no skew between the clock signals, only two or three may be necessary. It should also be noted that the number of flip-flops calculated according to the foregoing formula represents a minimum number and some embodiments may use more than this minimum number.

It should be noted that other embodiments may use devices other than flip-flops to store the transferred data values. For example, one or more multiple-entry FIFO (first in, first out) memory devices can be used. If the flip-flops in the embodiment described above are replaced with multiple-entry FIFOs, several data values can be loaded in each FIFO before the values are retrieved, thus reducing the required number of storage devices (but increasing the complexity of the devices.) In fact, the flip-flops of the embodiment described above function as a FIFO which can be loaded and unloaded at different rates.

In the embodiment of FIG. 7, flip-flops 51 are loaded (i.e., data values are stored in them) according to the pulses of the first clock signal. Flip-flops 51 are unloaded (i.e. data values are retrieved via multiplexer 55) according to the pulses produced by skip pattern generator 59. Skip pattern generator 59 takes the clock signal of the second clock domain and skips pulses as appropriate for the ratio of clock rates in the two clock domains. Skip pattern generator 59 may accomplish this function in a number of ways, such as looking up the appropriate pattern according to the values of M and N (i.e., the clock ratio) or dynamically computing the pattern. It is contemplated that the function of the skip pattern generator may also be accomplished in other ways, such as providing a clock signal without any skipped pulses and disabling the counter when a pulse should be skipped.

In one embodiment, the skip pattern generator is initialized to generate a particular skip pattern prior to any data transfer. During initialization, the M and N values corresponding to the transmitting and receiving clock domains are passed to the skip pattern generator. The pattern is then generated according to the received M and N values before any transfer takes place. During initialization, the system must also set the unload and load counters to the appropriate values so that stable data can be a retrieved from the flip-flops. If the load counter is initialized to 0 (corresponding to the first flip-flop,) the unload counter can be initialized to a value determined by the bit-time and the sum of ($delay_{max}-delay_{min}$), $T_{skew}$, and ($T_{setup}+T_{hold}$). The bit-time can be determined from pin sampling or from the serial bitstream. (It should be noted that, since transfers from a first clock domain to a second clock domain and transfers from the second clock domain to the first are handled separately, the initialization values for each of these transfers may be different.)

As explained above, it is important to set the load and unload counters so that the unloading of the counters lags behind the loading of the counters. This allows the values stored in the flip-flops to stabilize before being read. The system must therefore provide a mechanism for resetting the counters. This may be done either synchronously or asynchronously.

If the counters were reset asynchronously (i.e., reset at slightly different times,) the system would have to gate off the clock signals to the counters while they were being reset. This would ensure that the difference between the counters' values (and the corresponding lag between the loading and unloading of the flip-flops) would not be altered. The clock signals would then be reapplied to the counters. It should be noted, however, that a clock signal having a very high clock rate (e.g., 1 GHz) cannot simply be started at its full clock rate without drawing excessive amounts of current and possibly causing overheating and related problems. This is sometimes referred to as the "dI/dt problem" in reference to the change in current (I) over time. Because of the dI/dt problem, the clock rates of the domains must be ramped up to their normal rates. Consequently, such an asynchronous reset scheme can be very complex and possibly impractical to implement.

Figure 9:
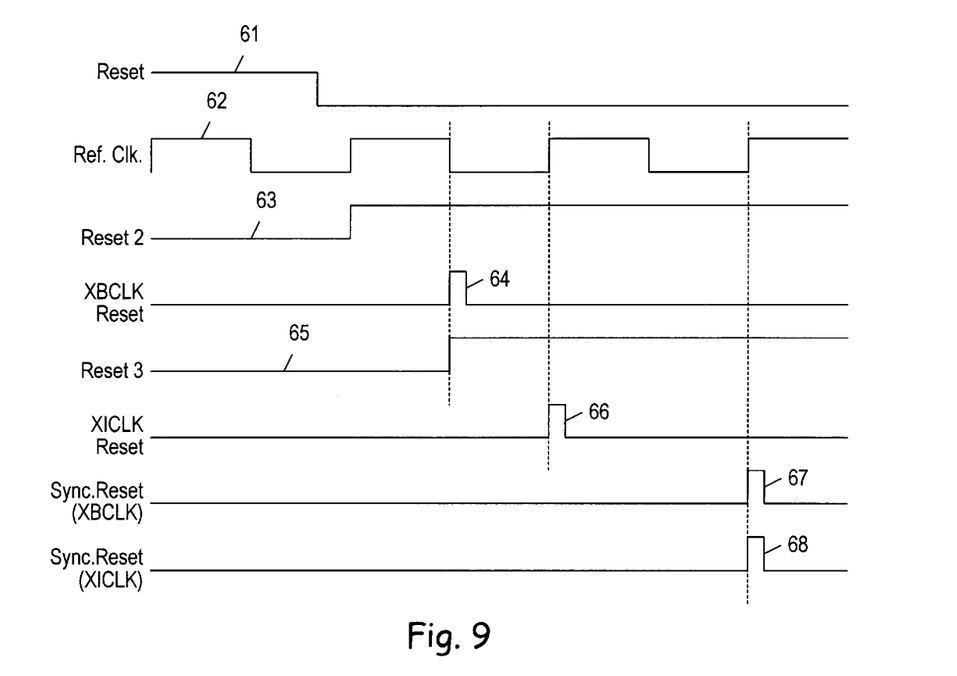
FIG. 9 is an illustration of various signals relating to the synchronous reset of one embodiments.

One embodiment instead uses a synchronous reset scheme. Several timing signals relating to this reset scheme are illustrated in FIG. 9. In this scheme, it is assumed that the skew between the clock signals of the two clock domains is less than half the period of the reference clock 62. After external reset signal 61 is deasserted, reset 2 signal 63 is deasserted on the next rising edge of reference clock 62. Reset 2 signal 63 remains deasserted for at least one reference clock period. On the next falling edge of reference clock 62, reset pulse 64 is generated by sampling reset 2 signal 63. When reset pulse 64 is generated, reset 3 signal 65 is deasserted and remains deasserted for at least one reference clock period. On the next rising edge of reference clock 62, reset pulse 66 is generated by sampling reset 3 signal 65. (As shown in the diagram of FIG. 9, reset 2 signal 63 and reset 3 signal 65 are asserted low.) Because it is known that at least one clock pulse in each clock domain is synchronized per reference clock period, synchronous reset signals 67 and 68 can be generated in the respective clock domains on one of these synchronous clock pulses. (In this embodiment, each clock domain has a pulse synchronized with the falling edge of the reference clock. See FIG. 6.) In the embodiment illustrated in FIG. 9, synchronous reset signals 67 and 68 are generated on the first synchronous pulse following second reset pulse 66.

While the present invention has been described with reference to particular embodiments, it will be understood that the embodiments are illustrative and that the invention scope is not so limited. Many variations, modifications, additions, and improvements to the embodiments described are possible. These variations, modifications, additions, and improvements may fall within the scope of the invention as detailed within the following claims.

What is claimed is:

1. A system comprising:
   a first device in a first clock domain, wherein said first clock domain has a first clock signal having a first clock rate; and
   a second device in a second clock domain, wherein said second clock domain has a second clock signal having a second clock rate;
   wherein the system is configured to perform clock skipping in transferring data from said first device to said second device;
   wherein said first device is configured to transmit an early response signal to said second device for a duration of k pulses of said first clock signal before transmitting said data;
   wherein said second device is configured to determine a number n, wherein n is the number of skipped pulses which will occur in said second clock domain prior to the occurrence of k valid pulses, and to receive said data k+n pulses of said second clock signal after receiving said early response signal; and
   wherein said second device includes a skip pattern generator configured to generate a pattern of valid and skipped pulses of said second clock signal.

2. The system of claim 1 wherein said skip pattern generator comprises a delay circuit configured to receive, said early response signal at a first time corresponding to a first clock pulse and to output said early response signal at a second time corresponding to a second clock pulse, wherein said first clock pulse and said second clock pulse are separated by n clock pulses.

3. The system of claim 2 wherein said skip pattern generator further comprises a second circuit configured to assert a signal indicative of n.

4. The system of claim 2 wherein said delay circuit comprises one or more parallel stages configured to receive said early response signal as an input, delay for a unique amount of time and produce said early response signal as an output, wherein said delay circuit is configured to selectively route said early response signal through on of said stages.

5. The system of claim 4 wherein each of said stages comprises an AND gate followed by one or more flip-flops in series, wherein said flip-flops are clocked by said second clock signal.

6. The system of claim 5 wherein each said AND gate has a first input configured to receive said early response signal and a second input configured to receive a corresponding delay signal.

7. The system of claim 6 wherein said skip pattern generator is configure to generate said delay signals.

8. A method for transferring data from a first device in a first clock domain to a second device in a second clock domain, wherein the second device periodically skips clock pulses, the method comprising:
   providing a first clock signal of said first clock domain and a second clock signal of said second clock domain, wherein said first clock signal has a lower clock rate than said second clock signal;
   the first device transmitting an early response signal to the second device prior to said first device transmitting data to said second device, wherein said early response signal has a fixed latency of k pulses of said first clock signal;

the second device receiving said early response signal;

the second device translating said fixed latency of said early response signal to k+n pulses of the second clock signal, wherein n is the number of skipped pulses occurring in said second clock domain prior to the occurrence of k valid pulses;

the first device delaying for said fixed latency in pulses of said first clock signal;

the second device delaying for said fixed latency in pulses of the second clock signal;

the first device transmitting data to said second device; and the second device receiving said data k+n pulses of said second clock signal after receiving said early response signal.

9. The method of claim 8 wherein translating said fixed latency of said early response signal comprises delaying said early response signal for n pulses of the second clock signal, wherein n is a number of skipped pulses which will occur between said second device receiving said early response signal and a $k^{th}$ valid pulse occurring, wherein said fixed latency comprises k valid pulses.

10. The method of claim 8 further comprising said second device generating a skip pattern having valid and skipped pulses and receiving said data only on said valid pulses.

11. The method of claim 10 further comprising said second device generating a signal indicative of a number of skipped pulses which will occur between said second device receiving said early response signal and a $k^{th}$ valid pulse occurring.

12. The method of claim 11 further comprising said second device delaying said early response signal for said number of skipped pulses and forwarding said early response signal to an early response signal-receiving circuit.

* * * * *